USO12276592B2

(12) United States Patent
Rodier

(10) Patent No.: US 12,276,592 B2
(45) Date of Patent: Apr. 15, 2025

(54) PARTICLE DETECTION VIA SCATTERED LIGHT COMBINED WITH INCIDENT LIGHT

(71) Applicant: Particle Measuring Systems, Inc., Boulder, CO (US)

(72) Inventor: Daniel Rodier, Boulder, CO (US)

(73) Assignee: Particle Measuring Systems, Inc., Boulder, CO (US)

( * ) Notice: Subject to any disclaimer, the term of this patent is extended or adjusted under 35 U.S.C. 154(b) by 149 days.

(21) Appl. No.: 17/341,998

(22) Filed: Jun. 8, 2021

(65) Prior Publication Data

US 2021/0381948 A1  Dec. 9, 2021

Related U.S. Application Data

(60) Provisional application No. 63/079,382, filed on Sep. 16, 2020, provisional application No. 63/036,930, filed on Jun. 9, 2020.

(51) Int. Cl.
G01N 15/1434  (2024.01)
G01N 15/0205  (2024.01)

(52) U.S. Cl.
CPC ..... *G01N 15/1434* (2013.01); *G01N 15/0211* (2013.01); *G01N 2015/1454* (2013.01)

(58) Field of Classification Search
None
See application file for complete search history.

(56) References Cited

U.S. PATENT DOCUMENTS 4,329,054 A  *  5/1982  Bachalo ............ G01N 15/0205
356/336
5,684,587 A  11/1997  Naqwi
(Continued)

FOREIGN PATENT DOCUMENTS

JP  H01-224644 A2  9/1989
JP  H03-221835 A2  9/1991
(Continued)

OTHER PUBLICATIONS

International Search Report and Written Opinion mailed Sep. 15, 2021 in International Application No. PCT/US2021/036388, 15 pp.
(Continued)

*Primary Examiner* — Rufus L Phillips
(74) *Attorney, Agent, or Firm* — LEYDIG VOIT & MAYER, LTD.

(57) ABSTRACT

Particle detection systems and methods are disclosed. In one embodiment, a particle detection system comprises an incident beam light source that emits an incident beam, a particle interrogation zone disposed in the path of the incident beam, a photodetector disposed to detect the incident beam after passing through the particle interrogation zone, a pump beam light source for emitting a pump beam, the pump beam being targeted at the particle interrogation zone, wherein the incident beam, the pump beam, and photodetector are arranged such that the photodetector is configured to detect a combination of light from the incident beam, scattered light due to incident beam scattering in the particle interrogation zone, and scattered light due to pump beam scattering in the particle interrogation zone.

20 Claims, 12 Drawing Sheets

1. Laser
2. Isolator
3. Phase mask
4. ½ wave plate
5. Polarizing beam splitter
6. Mirror
7. 50x microscope objective
8. 10x or 20x microscope objective
9. Flow cell
10. Digital microscope
11. Differential photodetector

(56) References Cited

U.S. PATENT DOCUMENTS

| | | | | |
|---|---|---|---|---|
| 5,760,900 | A * | 6/1998 | Ito | G01N 15/1434 356/73 |
| 6,139,800 | A * | 10/2000 | Chandler | G01N 15/1456 422/82.08 |
| 6,611,339 | B1 * | 8/2003 | Yang | A61B 5/0073 356/485 |
| 7,345,758 | B2 * | 3/2008 | van den Engh | G01N 15/1434 356/317 |
| 7,746,469 | B2 | 6/2010 | Shamir et al. | |
| 7,876,450 | B2 | 1/2011 | Novotny et al. | |
| 7,916,293 | B2 | 3/2011 | Mitchell et al. | |
| 9,983,113 | B2 | 5/2018 | Matsuda et al. | |
| 10,261,080 | B2 * | 4/2019 | Li | G01N 15/1459 |
| 10,345,246 | B2 | 7/2019 | Tian et al. | |
| 10,416,069 | B2 | 9/2019 | Saitou et al. | |
| 10,921,229 | B2 | 2/2021 | Shamir | |
| 11,507,020 | B2 * | 11/2022 | Wei | G06V 20/693 |
| 2001/0035954 | A1 * | 11/2001 | Rahn | G01N 15/0205 356/336 |
| 2004/0011974 | A1 | 1/2004 | Matsuda et al. | |
| 2005/0068536 | A1 | 3/2005 | Schwabe | |
| 2006/0092409 | A1 | 5/2006 | Magniez | |
| 2007/0285660 | A1 * | 12/2007 | Giglio | G01N 15/0205 356/336 |
| 2008/0246963 | A1 * | 10/2008 | Nakajima | G01N 15/0205 356/336 |
| 2009/0323061 | A1 | 12/2009 | Novotny et al. | |
| 2017/0038290 | A1 * | 2/2017 | Nakai | G01S 7/4916 |
| 2017/0045451 | A1 * | 2/2017 | Nolan | G01N 15/1429 |
| 2017/0176312 | A1 | 6/2017 | Shamir | |
| 2018/0202967 | A1 * | 7/2018 | Hsieh | G01N 27/44721 |
| 2019/0004299 | A1 | 1/2019 | Kukura et al. | |
| 2019/0234862 | A1 * | 8/2019 | Schladitz | G01N 15/0211 |
| 2019/0277745 | A1 | 9/2019 | Matsuda et al. | |
| 2020/0150018 | A1 | 5/2020 | Shamir | |
| 2020/0240896 | A1 | 7/2020 | Karasikov et al. | |
| 2020/0355599 | A1 | 11/2020 | Rodier et al. | |
| 2021/0208054 | A1 | 7/2021 | Ellis et al. | |

FOREIGN PATENT DOCUMENTS

| | | |
|---|---|---|
| JP | 2012-103259 A2 | 5/2012 |
| WO | 2019/082186 | 5/2019 |

OTHER PUBLICATIONS

Piestun et al. (2002) "Synthesis of three-dimensional light-fields and applications," Proc. IEEE, vol. 90(2), 220-244.

Extended European Search Report issued Jun. 3, 2024 in European Patent Application No. 21821428.6.

* cited by examiner

PARTICLE DETECTION VIA SCATTERED LIGHT COMBINED WITH INCIDENT LIGHT

CROSS-REFERENCE TO RELATED APPLICATIONS

This application claims the benefit of and priority to U.S. Provisional Patent Application No. 63/036,930 filed Jun. 9, 2020, and U.S. Provisional Patent Application No. 63/079,382 filed Sep. 16, 2020, each of which is hereby incorporated by reference in its entirety.

BACKGROUND OF INVENTION

Advancement of technologies requiring cleanroom conditions has resulted in the need for detection and characterization of increasingly smaller particles. For example, microelectronic foundries pursue detection of particles less than 20 nm in size, and in some cases less than 10 nm in size, as they may affect the increasingly sensitive manufacturing processes and products. Similarly, the need for aseptic processing conditions for manufacturing of pharmaceuticals and biomaterials requires accurate characterization of viable and non-viable particles to address compliance standard relating to health and human safety.

Typically, these industries rely on optical particle counters for detection and characterization of small particles. The ability to detect smaller particles requires new approaches for optical particle counting such as systems employing increasing laser powers, shorter excitation wavelengths and more complex techniques such as condensation nuclei counting, which in turn can dramatically increase the cost and overall complexity of devices capable of detection of nanometer scale particles. These new approaches can also require more frequent calibration and maintenance to provide the necessary reliability and reproducibility.

Various optical particle counters are known in the art, for example, scattered light optical particle counters are provided in U.S. Pat. No. 7,916,293 and transmission/extinction particle counters, including those utilizing structured beams and/or interferometry are provided in U.S. Pat. Nos. 7,746,469, 9,983,113, 10,416,069, US Patent Publication Nos. 2019/0277745 and US 20170176312, and PCT international Publication WO 2019/082186. Each of these references are hereby incorporated in their entirety and specifically to illustrate particle counter system components and configurations that are useful for the detection and characterization of small particles.

It can be seen from the foregoing that there is a need in the art for systems and methods that provide enhanced optical sensing of particles having small size dimensions.

SUMMARY OF THE INVENTION

The present invention relates to detection of particles. Systems and methods for detection of particles are provided, the systems and methods exhibiting enhanced signal to noise ratios, decreased sensitivity to thermal expansion and/or decreased sensitivity to optical misalignment. These improvements, in accordance with some embodiments herein, may be at least partially due to the optical combination and detection of scattered light and unscattered incident light. Specifically, in some embodiments, a photodetector may be placed in the optical path of a laser beam (i.e., a beam incident upon the photodetector), with a particle interrogation zone therebetween. The incident beam may be polarized, e.g., linearly polarized. With a particle in the particle interrogation zone, forward-scattered light resulting from incident beam/particle interactions may be essentially coincident with and parallel to the incident beam. Thus, the photodetector may detect a combination of unscattered light directly from the incident beam and light scattered in the forward direction by a particle in the interrogation zone.

However, especially for small particles, the intensity of the unscattered light directly from the incident beam may far outweigh the intensity of forward-scattered light, and the resulting signal to noise ratio may present significant issues in signal interpretation. It has been discovered that a second laser beam may be directed at the particle such that additional scattered light, e.g., side-scattered light, from the particle is combined with scattered and unscattered light from the incident beam. The second beam may be configured to produce scattered light that is essentially coherent and parallel to the incident beam and to the forward scattered light from the incident beam. Thus, in some embodiments, interference may occur between three types of light: (i) unscattered light from the incident beam, (ii) forward scattered light from the incident beam, and (iii) scattered light from the second beam. Accordingly, methods and devices herein may in some cases be referred to as "interferometric".

The combination of the three types of light may be directed onto the photodetector. The second beam may "pump" the scattered light component of the light detected at the photodetector without significantly altering the intensity of the incident light component. Accordingly, the sensitivity and/or the signal to noise ratio of the particle detection system may be greatly improved. Furthermore, the sample volume and/or the volumetric rate of sampling of fluid may be greatly improved, resulting in faster sampling times, especially for fluids having very low concentrations of particles. Additionally, the systems and methods disclosed herein may enable detection of more particles relative to the prior art (i.e., allow detection of particles which would have been missed by prior art systems), because prior art systems often allow particles which flow though the flow cell too far from the center of the beam to pass though undetected.

In some embodiments, the pump beam may be directed at the particle interrogation zone at an orthogonal angle to the incident beam. In such embodiments, the orthogonal pump beam configurations may give rise to side-scattered light being added to the combination of light detected at the photodetector. In other embodiments, the pump beam may be directed at the particle interrogation zone at an oblique angle relative to the incident beam, giving rise to obliquely-scattered scattered light being added to the combination of light detected at the photodetector. In still other embodiments, the pump beam may be directed at the particle interrogation zone at 180 degrees relative to the incident beam, giving rise to back-scattered light being added to the combination of light detected at the photodetector.

The systems and methods of the invention provide detection of particles in flowing fluids, including detection, counting and sizing of single particles in a fluid flow. In an embodiment, the fluid is a liquid or a gas. In an embodiment, the system is for detection of particles in liquid chemicals. In an embodiment, the system is for detection of particles in ultrapure water. In an embodiment, the system is for detection of particles in high pressure gases. In an embodiment, the system is for detection of particles in air. In an embodiment, the system is for detection of particles on surfaces.

In one embodiment, a particle detection system comprises an incident beam light source providing an incident beam, a particle interrogation zone disposed in the path of the incident beam, the particle interrogation zone including particles, a photodetector disposed to detect the incident beam after exiting the particle interrogation zone, and a pump beam light source providing a pump beam, wherein the pump beam is directed to the particle interrogation zone. The incident beam, the pump beam, and photodetector may be arranged such that the photodetector is configured to detect a combination of: light from the incident beam or a reference beam; scattered light due to incident beam scattering from the particles in the fluid flow in the particle interrogation zone; and scattered light due to pump beam scattering from the particles in the fluid flow in the particle interrogation zone.

In one embodiment, the incident beam intersects the pump beam in the interrogation zone.

In one embodiment, the incident beam, the pump beam, and photodetector are arranged such that the photodetector is configured to detect a combination of light from the incident beam, scattered light due to incident beam scattering from the particles in the particle interrogation zone and scattered light due to pump beam scattering from the particles.

In one embodiment, the incident beam, the pump beam, and photodetector are arranged such that the photodetector is configured to detect a combination of light from the reference beam, scattered light due to incident beam scattering from the particles in the particle interrogation zone and scattered light due to pump beam scattering from the particles.

In one embodiment, the reference beam is a homodyne interferometry reference beam.

In one embodiment, the reference beam is a heterodyne interferometry reference beam.

In one embodiment, a particle detection system comprises an incident beam light source that emits an incident beam, a particle interrogation zone disposed in the path of the incident beam, a photodetector disposed to detect the incident beam after passing through the particle interrogation zone, a pump beam light source for emitting a pump beam. The pump beam may be targeted at the particle interrogation zone. The incident beam, the pump beam, and photodetector may be arranged such that the photodetector is configured to detect a combination of light from the incident beam, scattered light due to incident beam scattering in the particle interrogation zone; and scattered light due to pump beam scattering in the particle interrogation zone.

In one embodiment, the scattered light due to incident beam scattering in the particle interrogation zone may be forward-scattered light. In one embodiment, the particle detection system may comprise a laser and a polarizing beam splitter. The incident beam light source may comprise light from the laser directed on a first light path via the polarizing beam splitter. The pump beam light source may comprise light from the laser directed on a second light path via the polarizing beam splitter.

In some embodiments, the incident beam is polarized prior to entering the interrogation zone. In some embodiments, the pump beam is polarized prior to entering the interrogation zone. In one embodiment both the incident beam and the pump beam may be created from a single light source, for example via a polarizing beam splitter. The pump beam may be modified via a ½ wave plate. The incident beam may be modified via a ½ wave plate. The polarized incident and pump beams may be configured such that, in the interrogation zone, the incident beam has a polarization axis that is essentially the same as the polarization axis of the pump beam. For example, in one embodiment the incident beam has a polarization axis that is within 5 degrees of the polarization axis of the pump beam. In one embodiment, the incident beam has a polarization axis that is within 3 degrees of the polarization axis of the pump beam. In one embodiment, the incident beam has a polarization axis that is within 2 degrees of the polarization axis of the pump beam. In one embodiment, the incident beam has a polarization axis that is within 1 degrees of the polarization axis of the pump beam. In one embodiment, the incident beam has a polarization axis that is within 0.1 degrees of the polarization axis of the pump beam.

Thus, in some embodiments, when the combination of light arrives at the photodetector, the scattered light due to incident beam scattering, the scattered light due to pump beam scattering, and the light from the incident beam each have a polarization axis that is that is essentially the same. For example, in one embodiment, the scattered light due to incident beam scattering, the scattered light due to pump beam scattering, and the light from the incident beam each have a polarization axis that is that is with 5 degrees of the others. In one embodiment, the scattered light due to incident beam scattering, the scattered light due to pump beam scattering, and the light from the incident beam each have a polarization axis that is that is with 3 degrees of the others. In one embodiment, the scattered light due to incident beam scattering, the scattered light due to pump beam scattering, and the light from the incident beam each have a polarization axis that is that is with 2 degrees of the others. In one embodiment, the scattered light due to incident beam scattering, the scattered light due to pump beam scattering, and the light from the incident beam each have a polarization axis that is that is with 1 degrees of the others. In one embodiment, the scattered light due to incident beam scattering, the scattered light due to pump beam scattering, and the light from the incident beam each have a polarization axis that is that is with 0.1 degrees of the others.

In one embodiment, the particle detector may comprise a first laser and a second laser, wherein the incident beam light source comprises light from the first laser, and wherein the pump beam light source comprises light from the second laser.

In one embodiment, the photodetector may produce a particle detection signal due to scattering in the particle interrogation zone, and the signal may correspond to the total irradiance of: (i) the light from the incident beam; (ii) the scattered light due to the incident beam; and (iii) the scattered light due to the pump beam.

In one embodiment, the particle detection signal has a magnitude at least 2 times larger than it would be absent the pump beam. In one embodiment, the particle detection signal has a magnitude at least 4 times larger than it would be absent the pump beam. In one embodiment, the particle detection signal has a magnitude at least 10 times larger than it would be absent the pump beam.

In one embodiment, the pump beam intersects the particle interrogation zone at an oblique angle to the incident beam. In one embodiment, the pump beam intersects the particle interrogation zone at an orthogonal angle to the incident beam. In one embodiment, the pump beam intersects the particle interrogation zone in the opposite direction as the incident beam. In one embodiment, the scattered light due to pump beam scattering in the particle interrogation zone is side-scattered light. In one embodiment, the scattered light due to pump beam scattering in the particle interrogation zone is back-scattered light.

In some embodiments, the particle interrogation zone comprises a flow cell configured to flow particles therethrough.

In some embodiments, the particle interrogation zone comprises a surface to be analyzed for the presence, size, number, etc. of particles. For example, in one embodiment, the particle interrogation zone comprises a surface and, the pump beam is directed at the particle interrogation zone at an oblique angle relative to the incident beam, giving rise to obliquely-scattered scattered light being added to the combination of light detected at the photodetector.

In one embodiment, the pump beam has an irradiance ratio of at least 1; wherein the irradiance ratio is defined as the ratio of the irradiance of the pump beam at its waist to the irradiance of the incident beam at its waist. In one embodiment, the pump beam has an irradiance ratio of at least 2. In one embodiment, the pump beam has an irradiance ratio of at least 10. In one embodiment, the pump beam has an irradiance ratio of at least 100.

In some embodiments, the pump beam has an irradiance ratio of less than 1. In some embodiments, the pump beam has an irradiance ratio of between 1 and 2.

In some embodiments, the waist of the pump beam is large compared to the waist of the incident beam. For example, in one embodiment, the waist of the pump beam is at least 1.5 times larger than the waist of the incident beam. In one embodiment, the waist of the pump beam is at least 2 times larger than the waist of the incident beam. In one embodiment, the waist of the pump beam is at least 3 times larger than the waist of the incident beam. In one embodiment, the waist of the pump beam is at least 5 times larger than the waist of the incident beam.

In one embodiment, the pump beam entering the particle interrogation zone has an average power at least 2 times larger than that of the incident beam entering the particle interrogation zone. In one embodiment, the pump beam has an average power at least 10 times larger than that of the incident beam. In one embodiment, the pump beam has an average power at least 100 times larger than that of the incident beam. In one embodiment, the pump beam has an average power at least 1000 times larger than that of the incident beam.

In one embodiment, the pump beam is configured as a multi-pass beam. In one embodiment, the incident beam is configured as a multi-pass beam. In one embodiment, the pump beam is configured as a dual-pass beam. In one embodiment, the incident beam is configured as a dual-pass beam.

In one embodiment, the pump beam is a structured beam. For example, in one embodiment, the pump beam is a dark beam.

In one embodiment, the incident beam is a structured beam. For example, in one embodiment, the incident beam is a dark beam.

In one embodiment, the incident beam is configured as a dual-pass dark beam. In one embodiment, the pump beam is configured as a dual-pass dark beam. In one embodiment, the incident beam is configured as a multi-pass dark beam. In one embodiment, the pump beam is configured as a multi-pass dark beam.

In one embodiment, the particle detection system is a pumped homodyne interferometric detection system. In one embodiment, the particle detection system is a pumped self-homodyne interferometric detection system. In one embodiment, the particle detection system is a pumped heterodyne interferometric detection system.

In one embodiment, the incident beam is passed through a cylinder lens, thus creating a conventional high aspect ratio beam incident beam.

In some embodiments, the pump beam may be a dual-pass beam. For example, in one embodiment, after passing through the interrogation zone, the pump beam may be reflected back on itself via collecting lens and a mirror, and then passed back through the interrogation zone. A dual-pass configuration for the pump beam may provide enhanced sensitivity and/or counting rate.

In one embodiment, an extinction optical particle counter comprises the particle detection system. In one embodiment of the extinction optical particle counter, the photodetector is a first photodetector, and the extinction optical particle counter comprises a second photo detector disposed to detect the pump beam after passing through the particle interrogation zone.

In some embodiments, the coupling between the pump beam and the incident beam may be improved by employing a narrow line width laser(s) and/or a single frequency laser(s) for the pump beam and or the incident beam.

In one embodiment, the particle detection system is a differential detection system. In one embodiment, the differential detection system is used to reduce noise at the detector.

In on embodiment, the particle detection system may comprise a diffractive optical element disposed in the path of the incident beam, between the incident beam light source and the particle interrogation zone.

In one embodiment, the diffractive optical element is configured to generate a 1-dimensional beam array. In one embodiment, the diffractive optical element is configured to generate a plurality of Gaussian beams.

In one embodiment, the diffractive optical element is configured to generate a plurality of beams, wherein each beam of the plurality of beams has an intensity variance of less than 5% when compared to the other beams.

In one embodiment, the photodetector comprises an upper zone and a lower zone. In one embodiment, the photodetector is a differential array detector.

In one embodiment, a particle detection system comprises: an incident beam light source providing an incident beam; a particle interrogation zone disposed in the path of the incident beam, the particle interrogation zone for containing a fluid flow having particles; a diffractive optical element disposed in the path of the incident beam, between the incident beam light source and the particle interrogation zone; and a photodetector disposed to detect the incident beam after passing through the particle interrogation zone. The incident beam and photodetector may be arranged such that the photodetector is configured to detect light from the incident beam and scattered light due to incident beam scattering from the particles in the fluid flow in the particle interrogation zone.

In one embodiment, the diffractive optical element is configured to generate a 1-dimensional beam array. In one embodiment, the diffractive optical element is configured to generate a plurality of Gaussian beams.

In one embodiment, the diffractive optical element is configured to generate a plurality of beams, wherein each beam of the plurality of beams has an intensity variance of less than 20% when compared to the other beams. In one embodiment, the photodetector comprises an upper zone and a lower zone. In one embodiment, the photodetector is a differential array detector.

In one embodiment, a particle detection system comprises an incident beam light source providing an incident beam, a particle interrogation zone disposed in the path of the incident beam, the particle interrogation zone including particles, a photodetector disposed to detect the incident beam after exiting the particle interrogation zone, and a pump beam light source providing a pump beam, wherein the pump beam is directed to the particle interrogation zone. The incident beam, the pump beam, and photodetector may be arranged such that the photodetector is configured to detect a combination of: light from the incident beam; scattered light due to incident beam scattering from the particles in the fluid flow in the particle interrogation zone; and scattered light due to pump beam scattering from the particles in the fluid flow in the particle interrogation zone.

In one embodiment, a method of particle detection comprises directing an incident beam at an interrogation zone and onto a photodetector, directing a pump beam at the particle interrogation zone, scattering light from the incident beam in the particle interrogation zone, scattering light from the pump beam in the particle interrogation zone and detecting, via the photodetector, a combination of light from the incident beam, scattered light from the incident beam; and scattered light from the pump beam.

In one embodiment, a method of particle detection comprises directing an incident beam to an interrogation zone containing a fluid flow having particles and onto a photodetector; directing a pump beam to the particle interrogation zone; generating scattered light by interaction of the incident beam with one or more particles in the particle interrogation zone; generating scattered light by interaction of the pump beam with one or more particles in the fluid flow in the particle interrogation zone; and detecting, via the photodetector, a combination of: light from the incident beam or a reference beam; scattered light from the incident beam; and scattered light from the pump beam.

In one embodiment, the method may include detecting, via the photodetector, a combination of: light from the incident beam; scattered light from the incident beam; and scattered light from the pump beam.

In one embodiment, the method may include detecting, via the photodetector, a combination of: light from the reference beam; scattered light from the incident beam; and scattered light from the pump beam.

In one embodiment, the method may comprise flowing a particle-containing fluid through the particle interrogation zone. In one embodiment, the detecting step comprises detecting forward scattered light from the incident beam.

In one embodiment, the method comprises emitting a laser beam from a laser, splitting the laser beam, via a polarizing beam splitter, into the pump beam and the incident beam. In one embodiment, the method comprises producing the incident beam via a first laser, and producing the pump beam via a second laser.

In one embodiment, the method may comprise producing a particle detection signal via the photodetector, wherein the signal corresponds to the intensity of the light from the incident beam combined with the scattered light from the incident beam and scattered light from the pump beam.

In one embodiment, a method comprises directing an incident beam at a particle, directing a pump beam at the particle, scattering light from the incident beam via the particle, scattering light from the pump beam via the particle, and detecting via photodetector a combination of light from the incident beam, scattered light from the incident beam, and scattered light from the pump beam.

In one embodiment, the method comprises diffracting the incident beam into a plurality of beams via a diffractive optical element. In one embodiment, the photodetector comprises an upper zone and a lower zone, the method comprising comparing a signal from the upper zone to a signal from the lower zone. In one embodiment, the method comprises increasing a volumetric sampling rate of the fluid flow via the diffracting step.

In one embodiment, the detecting step comprises detecting forward scattered light from the incident beam.

In one embodiment, a method of particle detection comprises: producing an incident beam; diffracting the incident beam into a plurality of beams via a diffractive optical element; directing the plurality of beams through an interrogation zone containing a fluid flow having particles and onto a photodetector; generating scattered light by interaction of the plurality of beams with one or more particles in the fluid flow in the particle interrogation zone; detecting, via the photodetector, scattered light from the plurality of beams.

In one embodiment, the photodetector comprises an upper zone and a lower zone, the method comprising comparing a signal from the upper zone to a signal from the lower zone. In one embodiment, the method comprises increasing a volumetric sampling rate of the fluid flow via the diffracting step. In one embodiment, the detecting step comprises detecting forward scattered light from the incident beam.

Without wishing to be bound by any particular theory, there may be discussion herein of beliefs or understandings of underlying principles relating to the devices and methods disclosed herein. It is recognized that regardless of the ultimate correctness of any mechanistic explanation or hypothesis, an embodiment of the invention can nonetheless be operative and useful.

STATEMENTS REGARDING CHEMICAL COMPOUNDS AND NOMENCLATURE

Figure 1:
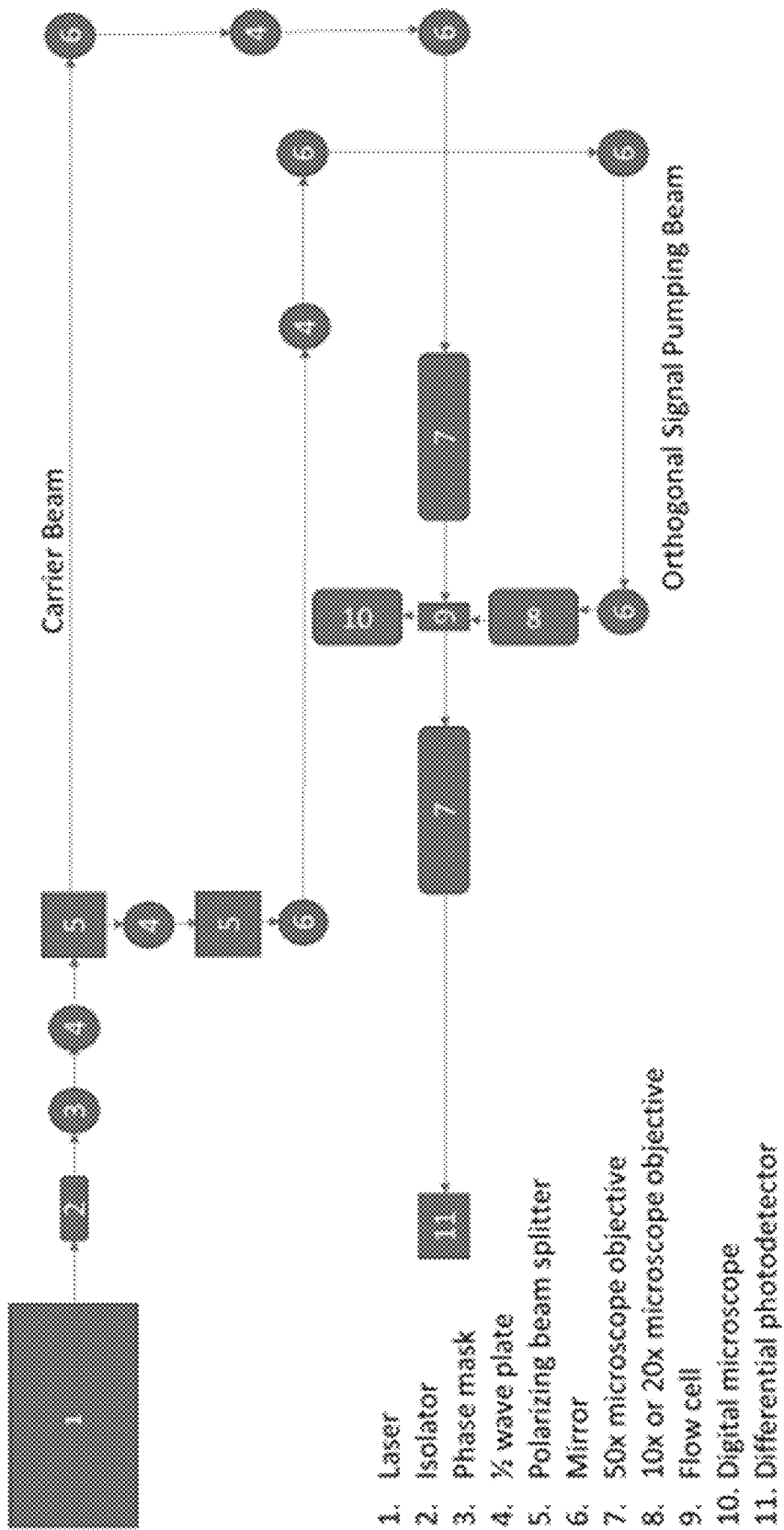
FIG. 1. Is a schematic diagram of a first example of a scattered light interference particle detection system.
Figure 2:
FIG. 2. Shows characteristic interference pattern signals observed on the incident beam as particles transit the beam.

In the following description, numerous specific details of the devices, device components and methods of the present invention are set forth in order to provide a thorough explanation of the precise nature of the invention. It will be apparent, however, to those of skill in the art that the invention can be practiced without these specific details.

In general, the terms and phrases used herein have their art-recognized meaning, which can be found by reference to standard texts, journal references and contexts known to those skilled in the art. The following definitions are provided to clarify their specific use in the context of the invention.

"Particles" refers to small objects which are often regarded as contaminants. A particle can be any material created by the act of friction, for example when two surfaces come into mechanical contact and there is mechanical movement. Particles can be composed of aggregates of material, such as dust, dirt, smoke, ash, water, soot, metal, oxides, ceramics, minerals, or any combination of these or other materials or contaminants. "Particles" may also refer to biological particles, for example, viruses, spores and microorganisms including bacteria, fungi, archaea, protists, other single cell microorganisms. In some embodiments, for example, biological particles are characterized by a size dimension (e.g., effective diameter) ranging from 0.1-15 μm, optionally for some applications ranging from 0.5-5 μm. A particle may refer to a small object which absorbs, emits or scatters light and is thus detectable by an optical particle counter. As used herein, "particle" is intended to be exclusive of the individual atoms or molecules of a carrier fluid, for example water, air, process liquid chemicals, process gases, etc. In some embodiments, particles may be initially present on a surface, such as a tools surface in a microfabrication facility, liberated from the surface and subsequently analyzed in a fluid. Some systems and methods are capable of detecting particles comprising aggregates of material having a size dimension, such as effective diameter, greater than 5 nm, 10 nm, 20 nm, 30 nm, 50 nm, 100 nm, 500 nm, 1 μm or greater, or 10 μm or greater. Some embodiments of the present invention are capable of detecting particles having a size dimension, such as effective diameter, selected from that range of 10 nm to 150 μm, optionally for some applications 10 nm to-10 μm, optionally for some applications 10 nm to-1 μm, and optionally for some applications 10 nm to-0.5 μm.

The expression "detecting a particle" broadly refers to sensing, identifying the presence of, counting and/or characterizing a particle, such as characterizing a particle with respect to a size dimension, such as effective diameter. In some embodiments, detecting a particle refers to counting particles. In some embodiments, detecting a particle refers to characterizing and/or measuring a physical characteristic of a particle, such as effective diameter, cross sectional dimension, shape, size, aerodynamic size, or any combination of these. In some embodiments, detection a particle is carried out in a flowing fluid, such as gas having a volumetric flow rate selected over the range of 0.05 CFM to 10 CFM, optionally for some applications 0.1 CFM to 5 CFM and optionally for some applications 0.5 CFM to 2 CFM. In some embodiments, detection a particle is carried out in a flowing fluid, such as liquid having a volumetric flow rate selected over the range of 1 to 1000 mL/min.

"Optical Particle Counter" or "particle counter" are used interchangeably and refer to a particle detection system that uses optical detection to detect particles, typically by analyzing particle in a fluid flow. Optical particle counters include liquid particle counters and aerosol particle counters, for example, including systems capable of detecting individual single particles in a fluid flow. Optical particle counters provide a beam of electromagnetic radiation (e.g. a laser) into the analysis area, where the beam interacts with any particles and then detects the particles based on scatter, emitted or transmitted light from the flow cell. Detection may focus on electromagnetic radiation that is scattered, absorbed, obscured and/or emitted by the particle(s). Various detectors for optical particle counters are known in the art, including for example, single detection elements (e.g., photodiode, photomultiplier tube, etc.), detector arrays, cameras, various detector orientations, etc. Optical particle counter includes condensation particle counters, condensation nuclei counters, split beam differential systems and the like. When used in the context of a condensation particle counter, the particle counter portion refers to the detection system (e.g. source of electromagnetic radiation, optics, filters, optical collection, detector, processor, etc.). In an embodiment, for example, an optical particle counter comprises a source for generating a beam of electromagnetic radiation, beam steering and/or shaping optics for directing and focusing the beam into a region where a fluid sample is flowing, for example a liquid or gas flowing through a flow cell. A typical optical particle counter comprises of a photodetector, such as optical detector array in optical communication with said flow cell, and collection optics for collecting and imagining electromagnetic radiation which is scattered, transmitted by or emitted by particles which pass through the beam. Particle counters may further comprise electronics and/or processors components for readout, signal processing and analysis of electrical signals produced by the photodetector including current to voltage converters, pulse height analyzers, and signal filtering and amplification electronics. An optical particle counter may also comprise a fluid actuation systems, such as a pump, fan or blower, for generating a flow for transporting a fluid sample containing particles through the detection region of a flow cell, for example, for generating a flow characterized by a volumetric flow rate. Useful flow rates for samples comprising one or more gases include a flow rate selected over the range of 0.05 CFM to 10 CFM, optionally for some applications 0.1 CFM to 5 CFM and optionally for some applications 0.5 CFM to 2 CFM. Useful flow rates for samples comprising one or more liquids include a flow rate selected over the range of 1 to 1000 mL/min.

The expression "interferometric detection of particles" refers to systems and methods using optical interference to detect one or more particles. In some embodiments, coherent beams of electromagnetic radiation are superimposed to cause optical interference for sensing, counting and/or determining a size characterization of a particle that interacts with at least a portion of the electromagnetic radiation.

As used herein, "structured beam interferometric detection" refers to interferometric systems and methods wherein a structured probe beam of electromagnetic radiation having a non-Gaussian intensity distribution is passed through a flow cell containing a particle and is detected using an optical detector array to sense, count and/or characterize the particle.

As used herein "homodyne interferometric detection" refers to interferometric systems and methods wherein an incident beam is passed through a flow cell where it interacts with a particle, thereby scattering light, which is collected and combined with a reference beam which is not frequency shifted relative to the incident beam, with the combined light being measured via a detector. In some embodiments, systems of the present disclosure are configured to provide pumped homodyne interferometric detection, wherein a pump beam intersects the incident beam in the particle interrogation zone, and thus a particle may interact with both beams, and the resultant scattered light from both beams may be combined with a reference beam which is not frequency shifted. Thus, in pumped homodyne interferometric detection, the scattered light component of the combined light measured by the detector may be increased.

As used herein "self-homodyne interferometric detection" refers to interferometric systems and methods wherein an incident beam is passed through a flow cell where it interacts with a particle, thereby scattering light, and the scattered light is combined with the incident beam with created it. In some embodiments, systems of the present disclosure are configured to provide pumped self-homodyne interferometric detection, wherein a pump beam intersects the incident beam in the particle interrogation zone, and thus a particle may interact with both beams, and the resultant scattered light from both beams may be combined with the incident beam. Thus, in pumped self-homodyne interferometric detection, the scattered light component of the combined light measured by the detector may be increased.

As used herein, the term "heterodyne interferometric detection" refers to interferometric systems and methods wherein an incident beam is passed through a flow cell where it interacts with a particle, thereby scattering light, which is collected and combined with a reference signal which is frequency shifted relative to the incident beam, with the combined light being measured via a detector. In some embodiments, systems of the present disclosure are configured to provide pumped heterodyne interferometric detection, wherein a pump beam intersects the incident beam in the particle interrogation zone, and thus a particle may interact with both beams, and the resultant scattered light from both beams may be combined with a reference signal which is frequency shifted. Thus, in pumped heterodyne interferometric detection the scattered light component of the combined light measured by the detector may be increased.

refers to interferometric systems and methods wherein Here the frequency of the reference beam is shifted and a lock-in amplifier is typically used with the photodetector a beam of coherent electromagnetic radiation is passed through a flow cell, combined with a separate reference beam and the combined beams are detected using an optical detector array to sense, count and/or characterize the particle. In some embodiments, particle counters are configured to provide heterodyne interferometric detection of said particles by collecting off-axis scattered light and combining the off-axis scattered light scattered light with a reference beam to create the interferometric signal.

As used herein, the expression "differential detection" refers to techniques and systems using the differential signal from forward looking on axis detector pair(s) for example, at a scattering angle that is within 0.5 degrees of zero degrees relative to the optical axis of the incident beam, optionally for some applications at a scattering angle that is within 0.1 degree of zero degrees relative to the optical axis of the incident beam, and optional is at or near zero degrees.

A minimum of two pixels can be used to generate a differential signal (e.g., one upper (or top) and one lower (or bottom)), thereby forming a single pixel pair for differential detection. Alternatively, a plurality of pixels may be employed for each active detector area of a differential detector (e.g., the top active region and the bottom active region), such as a segmented differential detector comprising one or more pixel pairs, thereby using a plurality of pixel pairs, for example, wherein one pixel of each pixel pair corresponds to top active detector region and the other pixel of each pixel pair corresponds to the bottom active region. The number of pixel pairs may range, for example, from 1 to 500 pixels and, and optionally for some applications from 50-100 pixels. In some embodiment, the differential signal is generated by differentially adding signals from pixel pairs corresponding to different active regions of a segmented detector array, such as the top half and the bottom half. Differential detection may be used in the present systems and methods to provide a reduction of noise and thus enhanced signal-to-noise ratio. In some embodiments, for example, differential detection is used for detection of the combination of incident electromagnetic radiation transmitted through said flow cell and electromagnetic radiation forward scattered by one or more particle(s) in the fluid flow in the flow cell. In some embodiments, for example, the distribution of light incident has a power distribution that is balanced between the first and second active detection regions (e.g., upper half and lower half) of the differential detector, for example, such that the first and second active detection regions are characterized by incident radiant powers that are within 10%, optionally for some applications 5% and optionally for some application within 1%. Differential detection includes techniques and systems having closed loop control, for example, based on an evaluation the noise amplitude of the differential signal when particles are not present (i.e., in the absence of scattering form the particle). In some embodiments, a steering mirror is used to adjust the incident beam position on the detector to reduce or minimize noise levels of the differential signal, which may occur when the beam power is uniformly split between the first and second active detector elements (e.g., upper and lower elements of the detector). Close loop control can also be achieved by translating the detector position and rotating the detector to align the beam and detector axes so as to reduce or minimize noise levels of the differential signal.

Detecting and counting small particles (e.g., effective diameter less than 100 nm) in clean and ultraclean fluids in a manner that provides statistically significant data requires high signal-to-noise ratio (S/N). A high S/N ratio allows nanoparticles to be clearly detected above the noise floor. As used herein "statistically significant data" refers to detection of enough particles per unit time to be able to accurately assess contamination levels in the fluid. In some embodiments, high S/N does not relate to sizing accuracy directly. For example, in some optical particle counters the beam waist occupies a small fraction of the flow cell channel, and therefore, this approach monitors a subset of the total flow, such that it is possible for particles to pass through the edge of the beam where irradiance is less than the center. If a 50 nm particle passes through the outer edge of the beam, it may generate a signal similar to a 10 nm particle passing through the center of the beam. Therefore, it is possible form some optical particle counters to have high S/N and be able to detect 2 nm particles, while not having very good sizing accuracy. In some of the present optical particle counters and methods a goal is to be able to count enough particles to provide a quantitative, statistically sound, assessment of contamination levels in ultrahigh purity fluids in the shortest period of time. For example, the current state of the art particle counter may require up to 40 minutes to count enough particles to provide a statistically appropriate concentration (acceptable relative standard deviation) measurement when monitoring a state of the art ultrapure water system. By improving and maintaining a high S/N through the present systems and methods, the time interval needed to measure this minimum statistically acceptable particle counts can be reduced by 10× or more. This provides value as it allows a user to identify deviations from process control limits more quickly.

The expression "high signal-to-noise ratio" refers to a signal-to-noise ratio of an optical particle detection system sufficient for accurate and sensitive detection of particles in a fluid flow, including particles characterized by a small physical dimension (e.g., an effective diameter of less than or equal to 200 nm, optionally for some embodiments less than or equal to 100 nm and optionally for some embodiments less than or equal to 50 nm). In an embodiment, "high signal-to-noise ratio" refers to a signal-to-noise ratio sufficiently high to sense particles characterized by a small physical dimension, such as particles having an effective diameter as low as 20 nm, optionally for some applications a diameter as low as 10 nm and optionally for some applications a diameter as low as 1 nm. In an embodiment, "high signal-to-noise ratio" refers to a signal-to-noise ratio sufficiently high to accurately detect and count particles with a false detection rate of less than or equal to 50 counts/L, for example, for detection of particles having an effective diameter selected over the range of 1-1000 nm. In an embodiment, "high signal-to-noise ratio" refers to a signal-to-noise ratio sufficiently high to provide a minimum statistically acceptable particle count in a timeframe at least a factor of 10× less than in a conventional optical particle counter.

The expression "significant performance degradation of the particle counting process" refers to degradation in the capability of a particle detection system to detect and count particles in a flowing fluid. In some embodiments, a significant performance degradation of the particle counting process refers to greater than or equal to a 20% shift in detection threshold voltage in the smallest size channel. In some embodiments, a significant performance degradation of the particle counting process refers to an increase in false counting rate greater than or equal to 50 counts/L. In some embodiments, a significant performance degradation of the particle counting process refers to an increase in the time required to provide a minimum statistically acceptable particle count of a factor of 5 or greater, optionally for some embodiments, a factor of 10 or greater. In some embodiments, a significant performance degradation of the particle counting process, for example as a result of poorly managed noise sources, refers to a degradation of S/N, resulting in poor detectability of the smallest particles. For example, degraded S/N can make the detected signal from a 50 nm look like a the signal from a 20 nm particle and can make a 20 nm particle signal be indistinguishable from the noise, resulting in lower detectability and fewer particles counted per unit time and/or the occurrence of false counts from the elevated noise levels.

As used herein, "structured beam" refers to a coherent beam of electromagnetic radiation (e.g. a laser) having a non-Gaussian spatial intensity distribution. Structured beams include beams characterized by an attenuated region, such as a dark beam, beams with a line focus with a dark line singularity, beams characterized by two or more discrete intensity lobes, etc. Structured beams include focused, synthesized, laser beams. Structured beams may be generated by techniques known in the art including using an optical mask, modification of a laser cavity, combining multiple beams, spatial and/or polarization filters and other manipulations such as in an interferometric or polarization modification scheme.

As used herein, "dark beam" refers to a laser beam that has a dark spot or dark line singularity at the center of a beam with an otherwise typically Gaussian envelop. The main advantage of this beam for the purpose of PSA (Particle Size Analysis) originates from the fact that the dark central spot/line is narrower than a classical Gaussian spot, having the same divergence, leading to the possibility of higher sensitivity to the position and structure of an obstructing object while maintaining sufficient volume of the Gaussian beam for concentration measurement and for larger particles interactions as well. Dark beams can be generated by converting a conventional laser beam with the help of an optical element (usually a diffractive element) or by a special design of the laser resonator in such a way that it emits a dark beam. Useful methods for generation of a dark beam include those described by R. Piestun, and J. Shamir, "Synthesis of three-dimensional light-fields and applications" Proc. IEEE, Vol. 90(2), 220-244, (2002). These laser modes are usually members of a set called Gauss-Laguerre and Gauss-Hermit modes.

As used herein, "dual-pass" refers to configurations in which a beam is first directed at the interrogation zone, then reflected back on itself (for example via a mirror) and is subsequently directed at the interrogation zone a second time. In the case where the interrogation comprises a flow cell or cuvette, dual-pass refers to a configuration wherein a beam passes once through the flow cell or cuvette, and is then reflected back through the flow cell or cuvette (for example, via a mirror). In the case where the interrogation zone comprises a surface to be interrogated for particles, dual-pass refers to a configuration wherein a beam is directed once at a surface, is reflected back off the surface, and is then reflected back at the surface (for example, via a mirror). By utilizing a dual pass configuration, a beam of light may interact twice with the same particle in the particle interrogation zone. Thus, a dual-pass configuration may increase the amount of light scattered by a particle, and thus increase the sensitivity of a particle detection system.

As used herein, "multi-pass" refers to configurations in which a beam is first directed at the interrogation zone, then reflected back on itself (for example via a mirror) and is subsequently directed at the interrogation zone a second time, then is directed back at the interrogation zone a third time (for example, via a semi-transparent mirror) and so on. In the case where the interrogation comprises a flow cell or cuvette, multi-pass refers to a configuration wherein a beam passes once through the flow cell or cuvette, and is then reflected back through the flow cell or cuvette (for example, via a mirror), then is directed back at the interrogation zone a third time (for example, via a semi-transparent mirror) and so on. In the case where the interrogation zone comprises a surface to be interrogated for particles, multi-pass refers to a configuration wherein a beam is directed once at a surface, is reflected back off the surface, and is then reflected back at the surface (for example, via a mirror), is reflected off the surface a second time, then is directed back at the interrogation zone a third time (for example, via a semi-transparent mirror) and so on. By utilizing a multi-pass configuration, a beam of light may interact many times with the same particle in the particle interrogation zone. Thus, a multi-pass configuration may increase the amount of light scattered by a particle, and thus increase the sensitivity of a particle detection system As used herein, "beam propagation axis" refers to an axis parallel to the direction of travel of a beam of electromagnetic radiation.

As used herein, "optical communication" refers to components which are arranged in a manner that allows light to transfer between the components.

As used herein, "optical axis" refers to a direction along which electromagnetic radiation propagates through a system.

As used herein, "optical detector array" refers to an optical detector capable of spatially resolving input signals (e.g., electromagnetic radiation) in two dimensions across an active area of the detector. An optical detector array is capable of generating an image, for example an image corresponding to an intensity pattern on the active area of the detector. In an embodiment, an optical detector array comprises an array of individual detector elements, also referred herein as pixels; for example: a two-dimensional array of photodetectors, a charge-coupled device (CCD) detector, a complementary metal-oxide-semiconductor (CMOS) detector, a metal-oxide-semiconductor (MOS) detector, an active pixel sensor, a microchannel plate detector, or a two-dimensional array of photodiodes.

As used herein, "light source" refers to a device or device component that is capable of delivering electromagnetic radiation to a sample. The term is not limited to visible radiation, such as by a visible light beam, but is used in a broad sense to include any electromagnetic radiation also inclusive of visible radiation, ultraviolet radiation and/or infrared radiation. The optical source may be embodied as a laser or laser array, such as a diode laser, diode laser array, diode laser pumped solid state laser, LED, LED array, gas phase laser, solid state laser, to name a few examples.

As used herein, the terms "electromagnetic radiation" and "light" are used synonymously in the present description and refer to waves of electric and magnetic fields. Electromagnetic radiation useful for the methods of the present invention include, but is not limited to ultraviolet light, visible light, infrared light, or any combination of these having wavelengths between about 100 nanometers to about 15 microns.

As used herein, the term "incident beam" refers to a beam of light, e.g., a laser beam, which is incident on a photodetector.

As used herein, the term "particle interrogation zone" refers to a zone of a particle detection system where one or more particles interact with the incident beam and/or the pump beam to scatter light. In some embodiments, the particle interrogation zone may comprise a cuvette and/or a flow cell to constrain a particle-containing liquid flowing therethrough. In other embodiments, an unconstrained jet of particle-containing gas may flow through the particle interrogation zone. In some embodiments, the particle interrogation zone may comprise a surface to be interrogated for particles.

As used herein, the term "pump beam" refers to a beam of light, e.g., a laser beam, which is configured to increase the scattered light component of the light detected by the photodetector.

As used herein, the term "reference beam" refers to a beam of light that does not interact with the particle under detection and optionally is phase matched with another source of electromagnetic radiation so as to generate optical interference.

DETAILED DESCRIPTION OF THE INVENTION

In the following description, numerous specific details of the devices, device components and methods of the present invention are set forth in order to provide a thorough explanation of the precise nature of the invention. It will be apparent, however, to those of skill in the art that the invention can be practiced without these specific details.

The particle detection signal measured on axis as a particle passes through a focused laser beam is thought to originate as an interference pattern created as the forward scattered light interacts with the incident (carrier) beam. The Van Cittert-Zernike theorem applies in this case to the collected scattered light, when the particle is in the blur spot and depth of focus of the collecting optic. The different angular values of the scattered field within the blur spot may be unresolvable due to the limitations of the collection optic. Thus, the scattered light is imaged into a plane wave that is coincident with and parallel to the incident field and is of the same phase. The scattered light collected within the blur spot is coherent.

This results in detectable interference between the scattered light and incident light with the amplitude of the signal proportional to the product of the scattered intensity and incident intensity.

When the two planar waves combine, the electric field observed at the detector, $E_d$, is $$E_d = E_c + E_s$$

where $E_c$ is the electric field of the carrier and $E_s$ is the electric field of the scattered light that is coincident with the carrier. The intensity at the detector is $$I_d = \varepsilon c E_d^2 = \varepsilon c (E_c + E_s)^2 = \varepsilon c (E_c^2 + E_s^2 + 2 E_c E_s)$$

where $\varepsilon$ is the permittivity of the medium and c is the speed of light. $E_c^2$ is essentially constant for small particle interactions. $E_s^2$ is fluctuating as small particles interact with the carrier beam, but its amplitude is very small. The important term, referred to as the interference term, is $2 E_c E_s$, which causes relatively large fluctuations in intensity at the detector as a small particle passes through the beam, creating interference. The amplitude of the interference signal is $2 E_c E_s \cos \delta$, where $\delta$ is the phase difference between the two waves. The phase difference changes due to the different pathlength between the scattered light and the incident (carrier) beam as the particle transits the excitation beam.

Thus, the detection signal can be increased by increasing the incident beam intensity on the detector and/or by increasing the scattered light intensity. The incident beam intensity has an upper limit of the saturation point of the detector/electronics. In addition to increasing signal amplitude with higher incident power, the detector shot noise will increase as well. However, the acceptable scattered intensity has practical no upper limit as the scattered intensity affects the magnitude of the transient detection signal while having almost no effect on overall beam power on the detector. Increasing the scattered intensity increases the detection signal without increasing the noise measurably. The scattered intensity can be pumped by a second beam that may be, for example, orthogonal to the incident beam (see FIG. 1). The scattered intensity can be pumped via forward or side scatter. It has been discovered that, so long as the phase is essentially the same (for maximum signal; it actually fluctuates and creates an AC signal on a DC background) and the scattering event occurs within the blur spot, the collected scattered intensity will be coherent and parallel to the incident low power beam. Thus, interference may occur and be detected at the detector.

Utility and benefits of this scattered intensity pumping may include the ability to increase particle detection signal without increasing noise. Systems employing this methodology may be more scalable than other systems. Further, the signal is created in situ, directly integrated into the incident beam. In some embodiments, systems and methods disclosed herein may reduce or eliminate z-axis alignment issues in addition to noise and/or thermal expansion issues to create stable interferometric signal.

Furthermore, systems and methods disclosed herein may benefit from laser noise reduction via a differential photodetector. The systems and methods disclosed herein may be used to measure particles in liquids, gases, and on surfaces.

The invention can be further understood by the following non-limiting examples.

Example 1: Single-Pass Pump Beam Nanoparticle Detection

Turning now to FIG. 1, an example of a single pass pump beam particle detection system is shown. The illustrated system includes a light source 1, an isolator 2, a phase mask 3, a plurality of ½ wave plates 4, two polarizing beam splitters, a plurality of mirrors 6, a pair of microscope objectives 7, a flow cell 9, a digital microscope 10, and a photodetector 11. As can be seen, source 1 produces a beam of light which is passed through the isolator 2, then a phase mask 3 and a ½ wave plate 4. The beam is then split into an incident beam (labeled Carrier Beam) and an orthogonal signal pumping beam via polarizing beam splitter 5. The incident beam is routed through another ½ plate 4, through the first microscope objective 7 and then through the interrogation zone (flow cell 9). After passing through the flow cell 9, the incident beam is then passed through the second microscope objective 7 and finally is directed onto the photodetector. After being split off from the incident beam via the first polarizing beam splitter, the pump beam is routed through a ½ wave plate 4, a polarizing beam splitter 5, another ½ wave plate 4, a microscope objective 8, and through the flow cell 9 at an orthogonal angle relative to the incident beam. After passing through the flow cell 9, the pump beam is directed at a digital microscope. A fluid, such as air or water, which containing particles suspended therein, may be flowed through the flow cell 9. As a particle passed through the flow cell 9, light from both the incident beam and pump beam may be scattered by the particle. Thus, light from the incident beam may combine with forward-scattered light due to incident beam/particle interaction and side-scattered light due to pump beam/particle interaction. Due to the optical configuration, particularly the ½ wave plates and polarizing beam splitters, the light from those three sources may be sufficiently phase matched to combine and be detected by the photodetector 11.

In the illustrated example, a 50× microscope objective 7 is used to create a single pass incident beam with a waist of about 2 um and a depth of field of roughly 7 um. A second 50× objective 7 is used as the collection optic and defines the blur spot where the particle/beam interactions generate signal. A low power (30 mW at the detector) beam is used in a single pass detection setup while a second, high power, pump beam (single laser source) is introduced into the flow cell in an orientation perpendicular to the propagation of the low power beam that goes to the detector. The high power beam (~3.5 W) is focused using a 10× objective the produces a beam waist diameter of ~10-12 um and a depth of field of roughly 300 um (good potential for interacting with high aspect ratio low power beam). Alternately, a 20× objective is used to focus the high power beam and creates a beam waist diameter of ~5-6 um and a depth of focus of roughly 45 microns.

Figure 6:
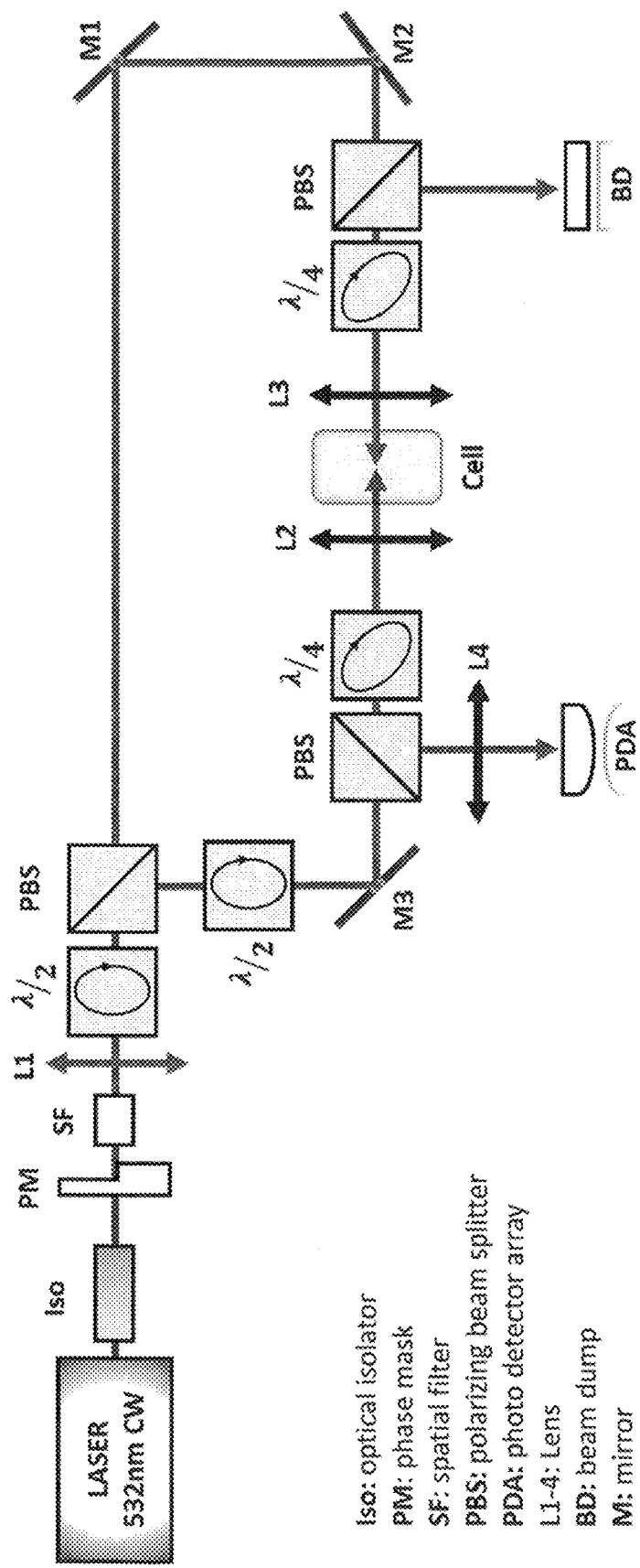
FIG. 6. Is a schematic diagram of a second embodiment of a system for particle detection via scattered light combined with incident light of the present disclosure.

Example 2: Pump Beam Disposed in the Opposite Direction as the Incident Beam in the Interrogation Zone Turning now to FIG. 6, in one embodiment, the pump beam may intersect the interrogation zone in the opposite direction as the incident beam. As can be seen, a polarizing beam splitter may be used to split a beam into an incident beam and a pump beam. The incident beam may be directed via mirrors (M1, M2) through a ¼ wave plate, the flow cell, and another ¼ wave plate. The pump beam may be directed, via M3 through the same two ¼ wave plates which sandwich the flow cell, but in the opposite direction as the incident beam. Thus, the incident beam, forward scattered light from the incident beam and back-scattered light from the pump beam may all be combined and collected on the photodetector array.

Example 3: Array of Beams

Figure 7:
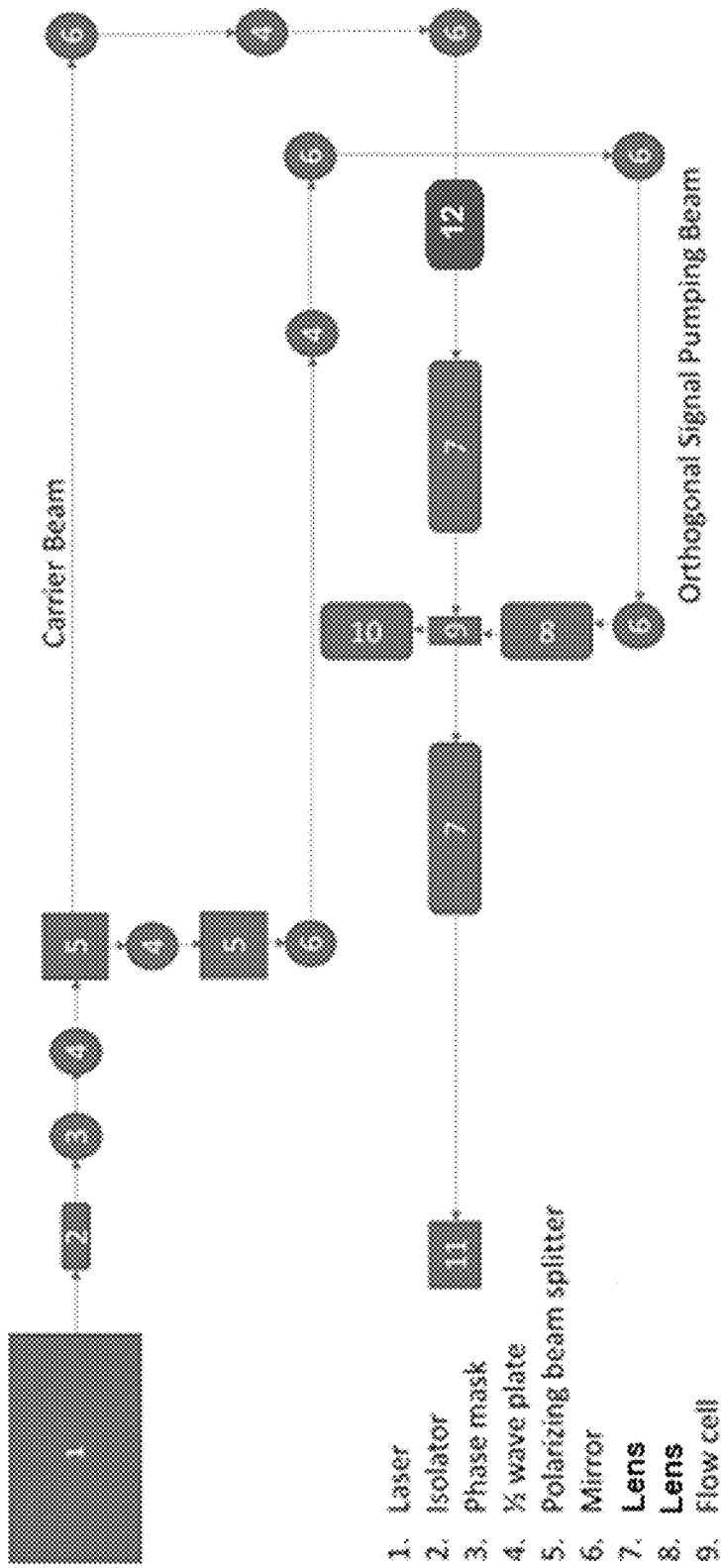
FIG. 7. Is a schematic diagram of a third embodiment of a system for particle detection via scattered light combined with incident light of the present disclosure, including a diffractive element to produce an array of incident beams.
Figure 8:
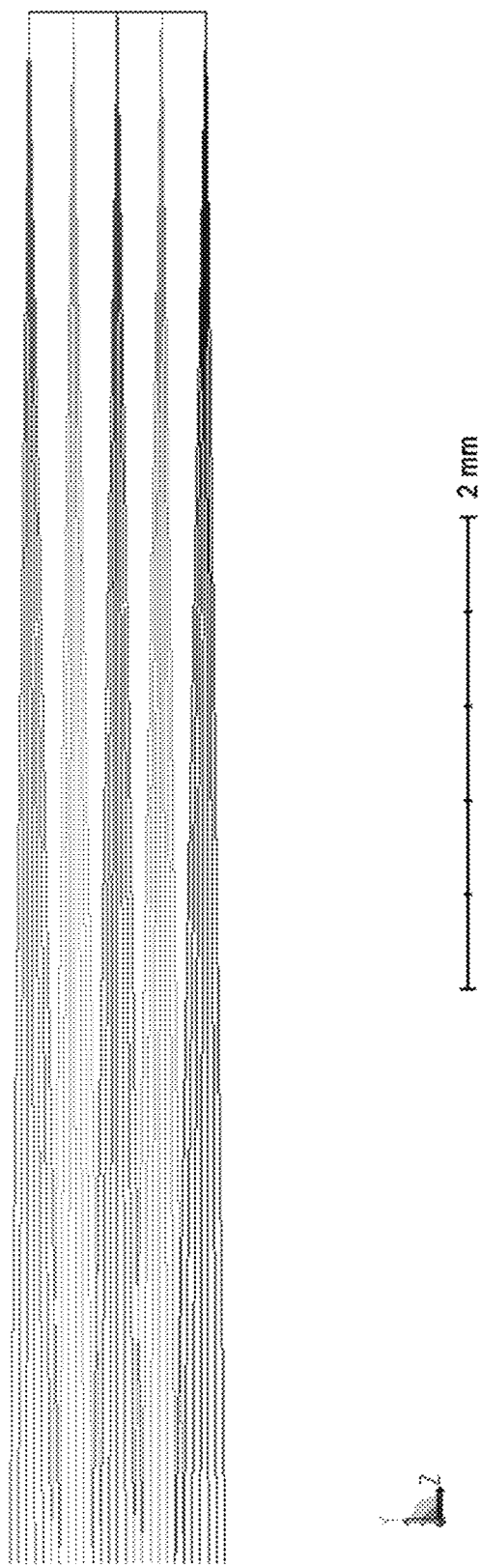
FIG. 8. Is a schematic diagram of light diffracting through a diffractive optical element.
Figure 9:
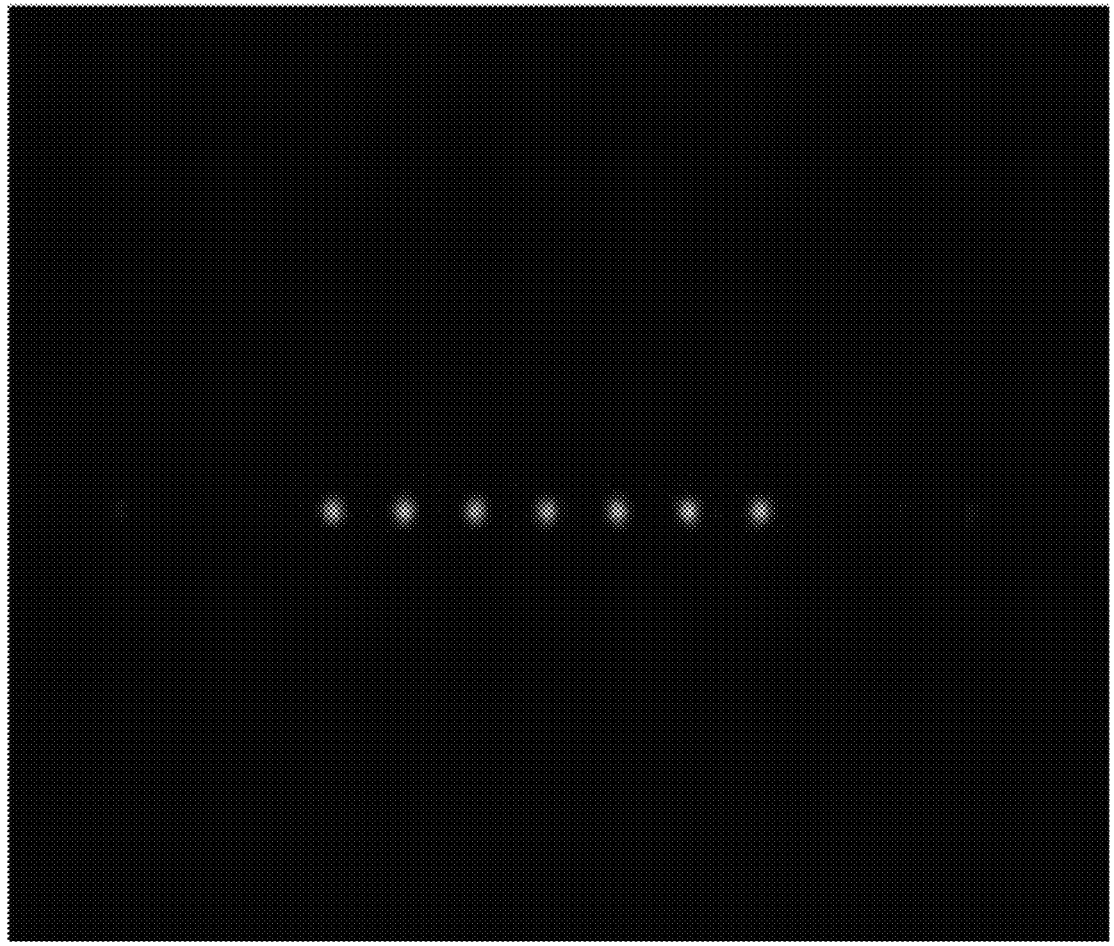
FIG. 9. Is a schematic diagram of a 1-dimensional beam array produced by the diffractive optical element of FIG. 8.

Turning now to FIGS. 7-9, in one embodiment, a diffractive optical element may be used to increase the volumetric sampling rate of a particle monitoring system. FIG. 7 shows one example. As shown, the particle monitoring system includes a diffractive optical element 12 in the optical path of the incident beam. The diffractive optical element 12 functions to produce an array of beams. FIG. 8 shows a schematic diagram of the effect of the diffractive optical element on a beam of light. As the light travels from left to right, the diffractive optical element, located on the left edge of the schematic diffracts the light into, in this case, 5 beams of essentially equal intensity.

The plurality of beams is directed through a fluid flow, which contains particles. The waist of each beam is imaged onto an upper and lower pair of detector elements. FIG. 9 shows the 1-dimensional array of beams produced from the diffractive optical element. By directing the array of beams through a fluid flow to be sampled by the beams, the volume of the fluid flow that may be sampled is increased as compared to only a single beam.

In the example, a 2×100 array of elements is used, but any array of multiple elements could be used, as long as there is an upper and lower portion. The signals from the upper and lower detector elements may be compared and analyzed for differential detection.

Furthermore, the diffractive optical element can be used with a Gaussian beam to create an array of Gaussian beams, or with a structured beam such as a dark beam, to create an array of dark beams.

Example 4: Particle Detection with Dual-Pass Pump Beam

Figure 10:
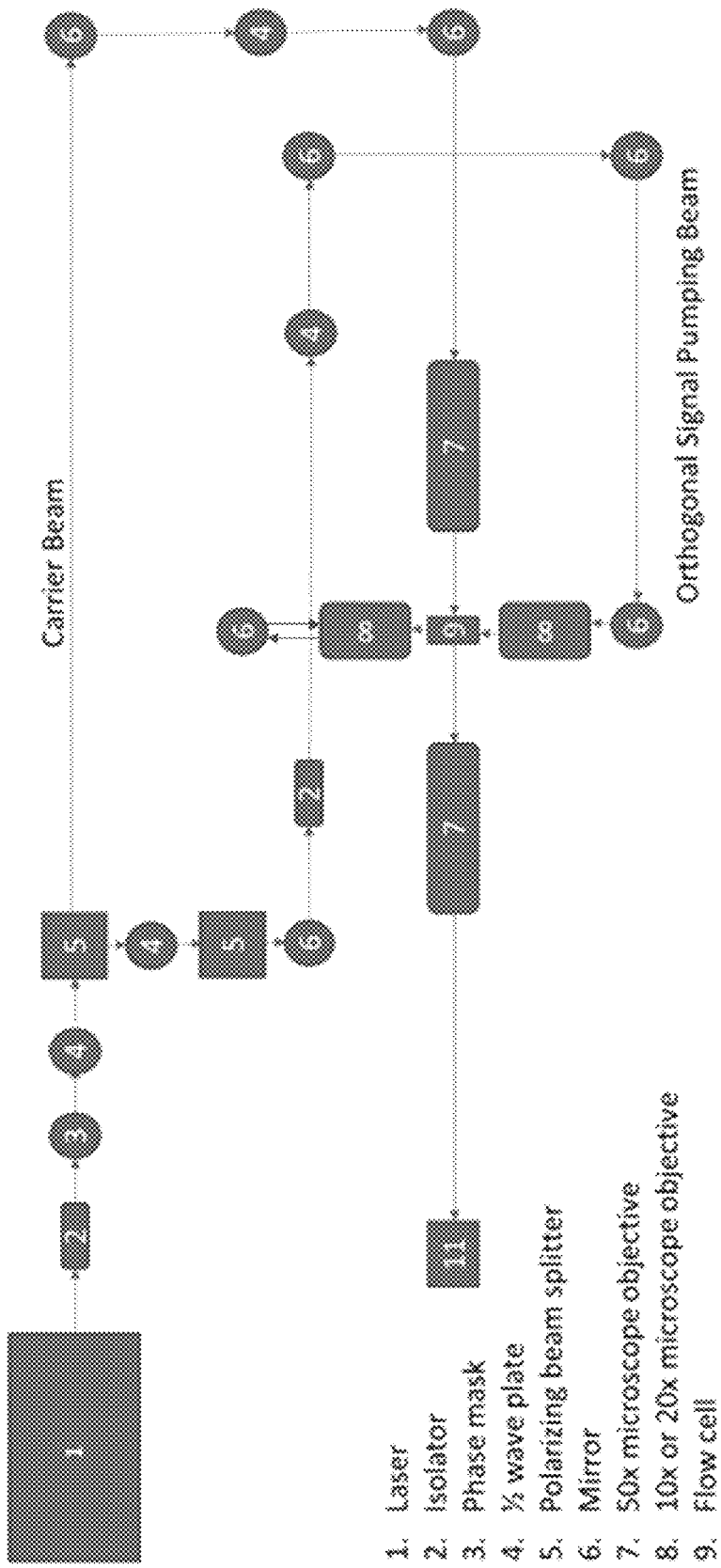
FIG. 10. Is a schematic diagram of a fourth embodiment of a system for particle detection via scattered light combined with incident light of the present disclosure, including a dual pass pump beam.

Turning now to FIG. 10, in one embodiment, the pump beam may be arranged in a dual-pass configuration. As shown, the pump beam passes through the flow cell 9, then through a microscope objective 8 after which the beam is reflected off a mirror 6 and back through the microscope objective 8 and back through the flow cell 9. Thus, a particle passing through the flow cell may scatter light from the pump beam once as the pump beam passes through the flow cell the first time, and then again as the pump is reflected and passes back through the flow cell a second time. Accordingly, the signal amplitude produced by the photodetector in response to a particle passing through the particle interrogation zone may be significantly increased as compared to a single pass pump beam configuration.

It should be noted that alternatively or additionally to a dual-pass pump beam, the incident beam may be configured as a dual pass beam.

Example 5: Comparison of Nanoparticle Detection with Dual-Pass Pump Beam Vs. Single-Pass Pump Beam Vs. Conventional (No Pump Beam)

Figure 3:
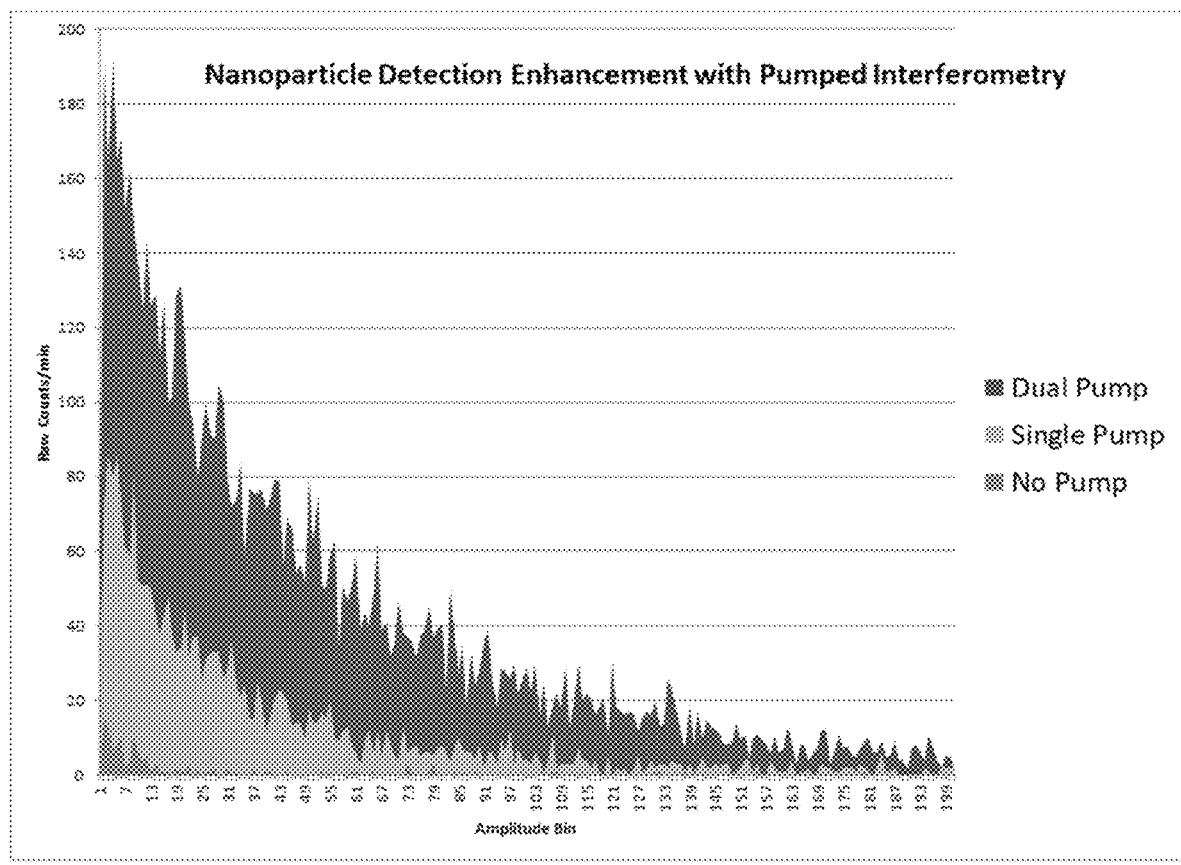
FIG. 3 Shows a comparison of the detection signals for a Dual-Pass Pump Beam system vs. Single-Pass Pump Beam system vs. Conventional (No Pump Beam) system.
Figure 4:
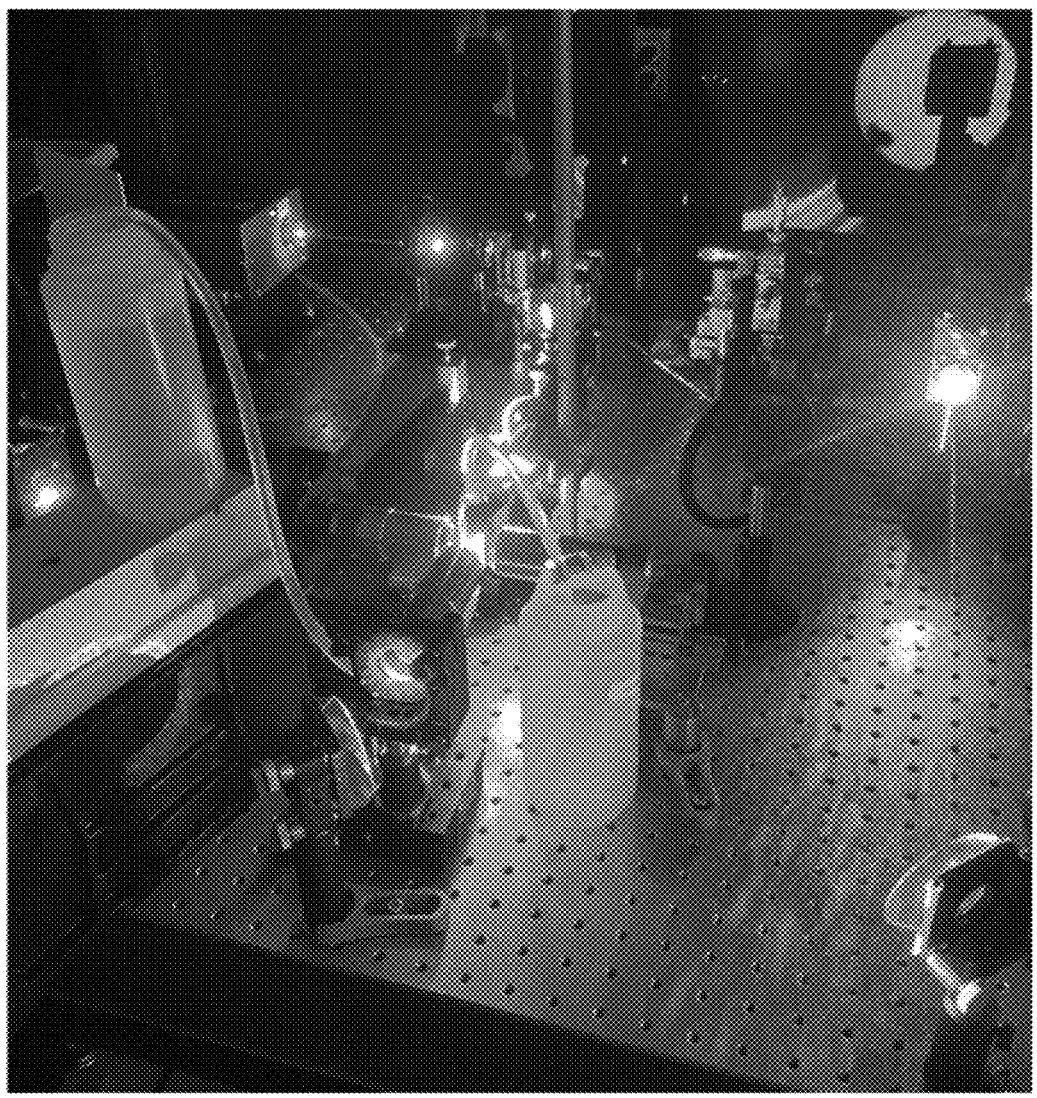
FIG. 4. Shows a one embodiment of a system for particle detection via scattered light combined with incident light of the present disclosure.
Figure 5A:
FIGS. 5A-5B. Two micron carrier beam (going R to L) with a five micron signal pumping beam going into the plane of the page (FIG. 5A) and same with dark beam (FIG. 5B).
Figure 5B:
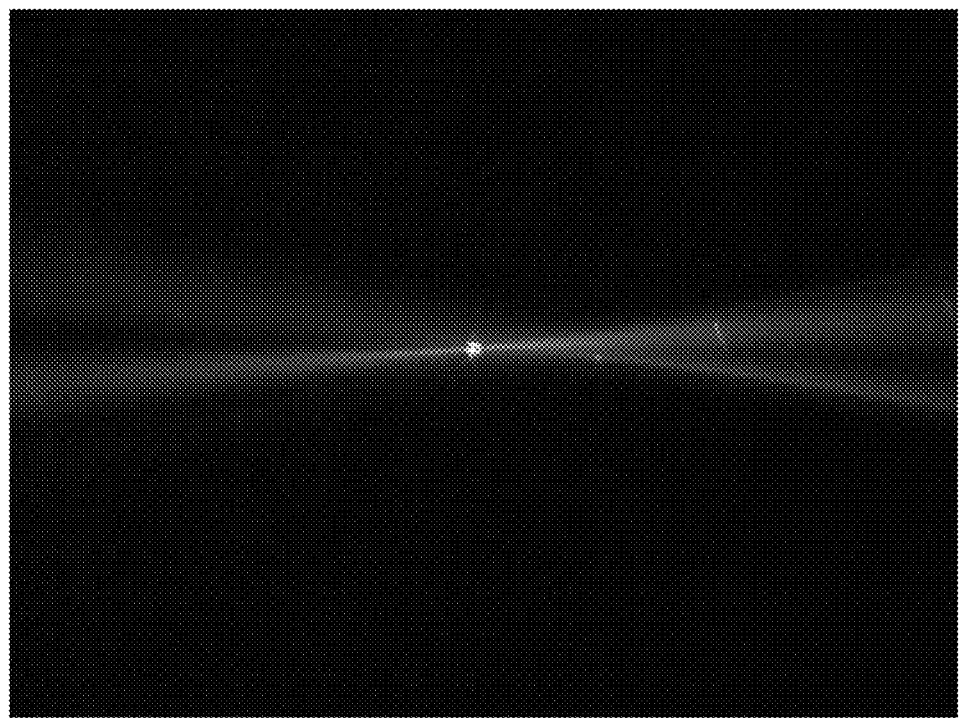

The net effect of the nanoparticle detection enhancement achieved through pumped interferometry is twofold. The detected signal amplitude is significantly increased as evidenced by a comparison of the extent of pumped and non-pumped data along the amplitude axis of FIG. 3. In the experiment of FIG. 3, a monodispersion of particles was fed through a dual pass pump beam particle detector (similar to that of FIG. 10), a single pass pump beam particle detector (similar to that of FIG. 1) and conventional particle detector without beam pumping. The area under each curve represents the number of particles detected per minute. As can be seen, the single pump and dual pump configurations afford the detection of many more nanoparticles/time than the non-pumped measurement. This is due to the enhanced detection sensitivity and the detection of particles which pass near the incident beam, but do not pass through the incident beam. Particles which pass through the larger sized pump beam in the vicinity of the incident beam can create scattered light which results in signal generation within the incident beam. This effectively increases the volume of fluid sensed per unit time vs. a non-pumped incident beam.

Example 6: Parallel Beams for Surface Detection

Figure 11:
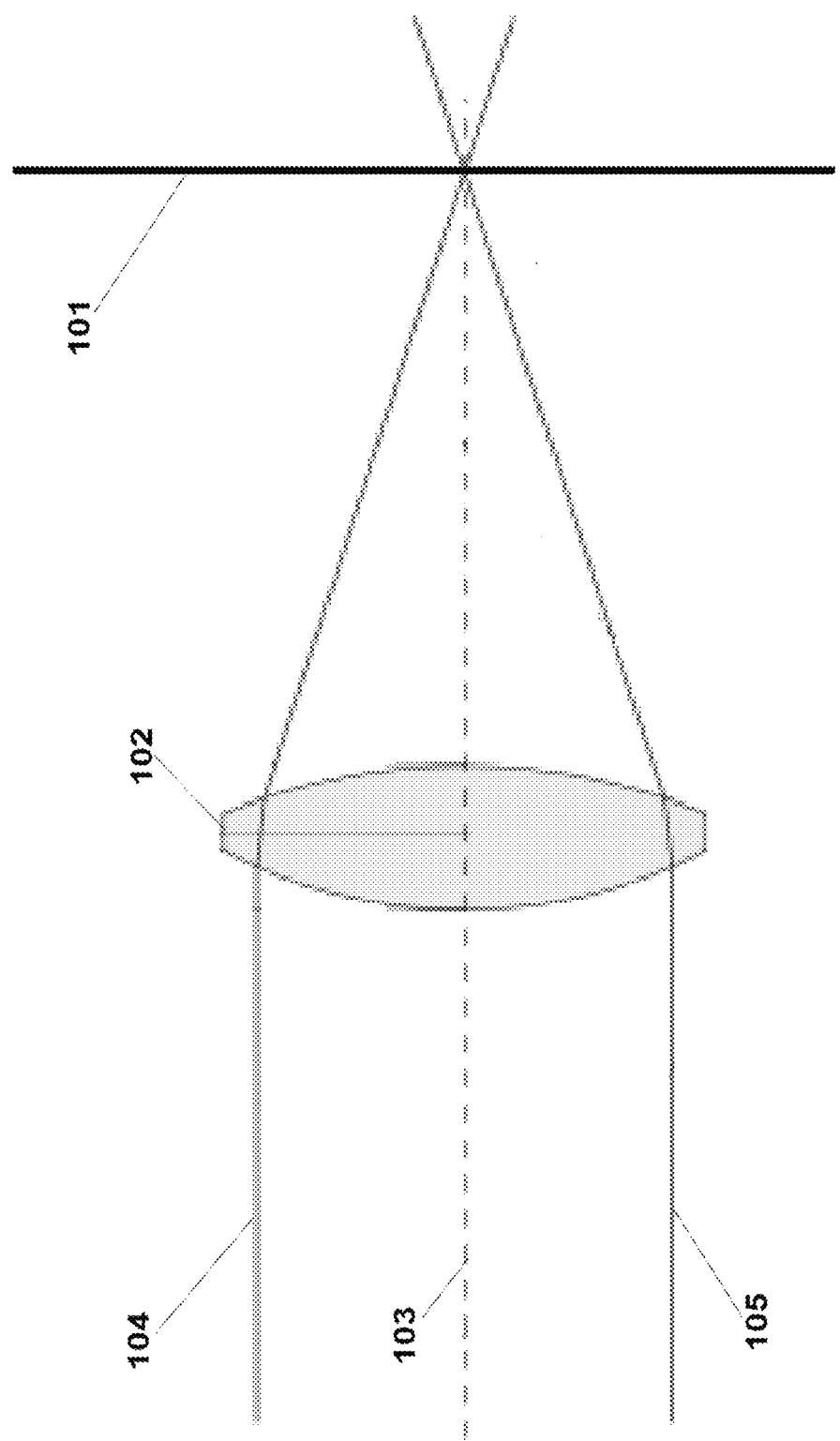
FIG. 11. Is schematic diagram of a fifth embodiment of a system for particle detection via scattered light combined with incident light of the present disclosure, including parallel pump beam and incident beams for surface particle detection.

Turning now to FIG. 11, in one embodiment, the pump beam 104 and incident beam 105 may have parallel propagation axes as they approach the interrogation zone, in this case surface 101. Just prior to reaching the interrogation zone 101, both beams may pass through a converging lens 102 having an axis 103 parallel to the propagation axes of the beams 104, 105. The surface 101 may be disposed at the focal point of the two beams. Thus, a particle on the surface 101 may scatter light from both beams 104, 105. In some embodiments, a system employing the parallel beam configuration of FIG. 11 may include a ¼ wave plate and a polarizing beam splitter. The beams may pass through the polarizing beam splitter, then through the ¼ wave plate, then through objective, then interact a first time with the particle, then reflect off the surface, then interact a second time with the particle, then pass back through the objective, back through the ¼ waveplate, and back to the polarizing beam splitter where the incident beam is redirected 90 deg. Thus, via 2 passes through the ¼ wave plate, the result is the polarization of the return beam may be orthogonal to the source beam.

Example 7: Pumping Interferometric Beams

In one embodiment, two parallel beams with opposite polarizations may be created via a calcite beam. The first beam may be a low power incident beam and the second beam may be a high power pump beam. One of the beams may be passed through a ½ wave plate to match the polarizations before the beams pass through a positive lens which focuses the beams to a shared focal point at the particle interrogation zone which could be on a surface, or in a flowing gas or liquid fluid. After the beams pass through the focal point where they can interact with a particle, the two beams diverge and can be recollimated with another lens. The pump beam is then redirected away from the incident beam using a mirror or a knife-edged prism (sent to a beam dump) and the incident beam is transferred to a differential photodetector.

Example 8: Low Power Laser Embodiments

In some embodiments, the system may function across a wide range of laser powers by using different photodetector technologies. For example in some embodiment, the photodetector may comprise silicon PIN photodiodes and the laser power at the detector may be in the range of 5-50 mW for the incident beam with 500-10,000 mW at the pump beam. In alternative embodiments, the photodetector may comprise more sensitive avalanche photodiodes and the laser power at the detector may be in the range of 0.001-0.01 mW for the incident beam with 0.1-200 mW power in the pump beam. In some embodiments, the laser power could be further reduced by using photomultiplier tube detectors. The ability to perform nanoparticle detection utilizing low power lasers enables lower costs and more compact instrumentation, while also eliminating the need for an actively cooled laser.

Example 9: Dual-Pass Incident Beam

Figure 12:
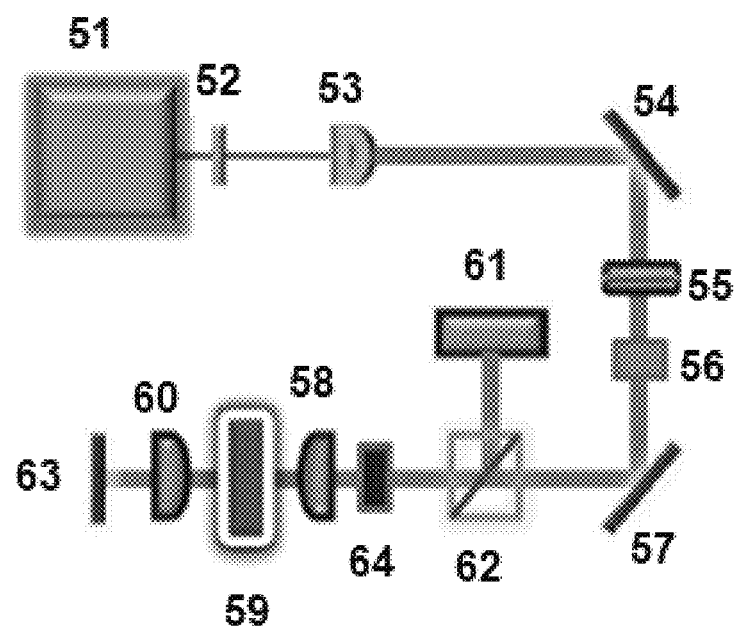
FIG. 12. Is a schematic diagram of a sixth embodiment of a system for particle detection via scattered light combined with incident light of the present disclosure, including a dual-pass incident beam configuration.

Turning now to FIG. 12, one embodiment of a particle detection system configured with a dual-pass incident beam is shown. An incident beam of light may be generated by light source 51 (e.g., laser). The incident beam may be passed through an isolator 52, and then a beam expander 53. The incident beam may then be reflected off mirror 54 and (optionally) passed through a phase mask 55. The incident beam may then be passed through a half-wave plate 56 and reflected of mirror 57. The incident beam may then pass through polarizing beam splitter 62, and then through quarter-wave plate 64. The incident beam may then be passed through an objective 58 and then though cuvette 59. A particle-laden fluid may flow through the cuvette 59. Accordingly, the incident beam may interact with a particle, scattering light, as it passes through the cuvette 59. The incident beam, along with forward-scattered light from the particle/beam interaction may then be passed through collecting optic 60, and be reflected, via mirror 63, back through optic 60 and back into the cuvette 59 a second time, in the opposite direction as the first. Accordingly, the incident beam may interact with the particle a second time (the particle may still be in essentially the same position within the cuvette as it was during the first particle/beam interaction, given the speed of light relative to the velocity of the fluid through the cuvette). A pump beam (not shown) may also be passed through the cuvette 59, for example orthogonal to the incident beam (out of the page). Thus the incident beam, along with forward-scattered light from both particle/incident beam interactions may be combined with side-scattered light due to the interaction of the particle with the pump beam. This combination of light may then be passed through objective 58, through quarter-wave plate 64 and finally directed, via polarizing beam splitter 26, onto detector 61.

Statements Regarding Incorporation by Reference and Variations

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

As used herein and in the appended claims, the singular forms "a", "an", and "the" include plural reference unless the context clearly dictates otherwise. Thus, for example, reference to "a cell" includes a plurality of such cells and equivalents thereof known to those skilled in the art. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

Every device, system, formulation, combination of components, or method described or exemplified herein can be used to practice the invention, unless otherwise stated.

Whenever a range is given in the specification, for example, a temperature range, a time range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

We claim:

1. A particle detection system comprising:
    a light source providing beam of light, wherein the light source comprises a laser;
    a half wave plate disposed in the path of the beam;
    a beam splitter that splits the beam from the laser into an incident beam and a pump beam;
    a particle interrogation zone disposed in the path of the incident beam;
    a photodetector disposed to detect the incident beam after exiting the particle interrogation zone;
    wherein the pump beam is directed to the particle interrogation zone along a different optical path than that of the incident beam, such that unscattered light from the pump beam is not incident on the photodetector;
    a first objective that focuses the incident beam to a first waist radius in the particle interrogation zone;
    a second objective that focuses the pump beam in the particle interrogation zone to a second waist radius in the particle interrogation zone;
    wherein the second waist radius is at least 1.5 times larger than the first waist radius in the particle interrogation zone;
    wherein the pump beam has an irradiance ratio of at least 2, wherein the irradiance ratio is defined as the ratio of the irradiance of the pump beam at its waist to the irradiance of the incident beam at its waist;

a collection optic for collecting a combination of:
  unscattered light from the incident beam after exiting the particle interrogation zone;
  scattered light due to incident beam scattering via a particle in the particle interrogation zone; and
  scattered light due to pump beam scattering via the particle;
  wherein, when exiting the collection optic, the collected scattered light from the incident beam and the pump beam is coherent and parallel to the collected unscattered light from the incident beam;
wherein the incident beam, the pump beam, and photodetector are arranged such that the photodetector is configured to detect a combination of:
  the unscattered light from the incident beam;
  the scattered light due to incident beam scattering from the particles in the fluid flow in the particle interrogation zone; and
  the scattered light due to pump beam scattering from the particles in the fluid flow in the particle interrogation zone.

2. The particle detection system of claim 1, wherein the incident beam intersects the pump beam in the interrogation zone.

3. The particle detection system of claim 1, wherein the scattered light due to incident beam scattering in the particle interrogation zone is forward-scattered light.

4. The particle detection system of claim 1, wherein:
the incident beam is polarized prior to entering the interrogation zone;
the pump beam is polarized prior to entering the interrogation zone; and
the incident beam and the pump beam are configured such that, in the interrogation zone, the incident beam has a polarization axis that is within 5 degrees of a polarization axis of the pump beam.

5. The particle detection system of claim 1, wherein, at the photodetector, the scattered light due to incident beam scattering, the scattered light due to pump beam scattering, and the light from the incident beam each have a polarization axis that is with 5 degrees of the others.

6. The particle detection system of claim 1, wherein the photodetector produces a particle detection signal due to scattering in the particle interrogation zone, and wherein the signal corresponds to the total irradiance of:
(i) the light from the incident beam
(ii) the scattered light due to the incident beam; and
(iii) the scattered light due to the pump beam.

7. The particle detection system of claim 1, wherein the pump beam intersects the particle interrogation zone at an oblique angle to the incident beam.

8. The particle detection system of claim 1, wherein the pump beam intersects the particle interrogation zone at an orthogonal angle to the incident beam.

9. The particle detection system of claim 1, wherein the pump beam intersects the particle interrogation zone in the opposite direction as the incident beam.

10. The particle detection system of claim 1, wherein the pump beam and incident beam are directed in parallel though a positive lens which focuses the beams to a shared focal point at the particle interrogation zone.

11. The particle detection system of claim 1, wherein the particle interrogation zone is a flow cell.

12. The particle detection system of claim 1, wherein the particle interrogation zone is an aerosol jet.

13. The particle detection system of claim 1, wherein the particle interrogation zone is a surface.

14. The particle detection system of claim 1, wherein the pump beam is a dual-pass beam.

15. The system of claim 1, wherein the particle has an effective diameter less than 100 nm.

16. A method of particle detection comprising:
producing a beam of light via a laser;
passing the beam of light through a half wave plate;
splitting the beam into an incident beam and a pump beam via a beam splitter;
directing the incident beam to a particle interrogation zone and onto a photodetector;
directing the pump beam to the particle interrogation zone along a different optical path than that of the incident beam, such that unscattered light from the pump beam is not incident on the photodetector;
passing the incident beam through a first objective that focuses the incident beam to a first waist radius in the particle interrogation zone;
passing the pump beam through a second objective that focuses the pump beam to a second waist radius in the particle interrogation zone;
wherein the second waist radius is at least 1.5 times larger than the first waist radius in the particle interrogation zone;
wherein the pump beam has an irradiance ratio of at least 2, wherein the irradiance ratio is defined as the ratio of the irradiance of the pump beam at its waist to the irradiance of the incident beam at its waist;
generating scattered light by interaction of the incident beam with a particle in the particle interrogation zone;
generating scattered light by interaction of the pump beam with the particle;
collecting, via a collection optic, a combination of:
unscattered light from the incident beam after exiting the particle interrogation zone;
scattered light due to incident beam scattering via a particle in the particle interrogation zone; and
scattered light due to pump beam scattering via the particle;
wherein, when exiting the collection optic, the collected scattered light from the incident beam and the pump beam is coherent and parallel to the collected unscattered light from the incident beam;
detecting, via the photodetector, the combination of:
the unscattered light from the incident beam;
the scattered light from the incident beam; and
the scattered light from the pump beam.

17. The method of claim 16 comprising producing a particle detection signal via the photodetector, wherein the signal corresponds to the intensity of the light from the incident beam combined with the scattered light from the incident beam and scattered light from the pump beam; and wherein a particle is detected when the signal exceeds a threshold value.

18. The method of claim 16, wherein said incident beam and said pump beam are configured to simultaneously interact with said particles in said fluid flow.

19. The method of claim 16, wherein said scattered light is generated by interaction of said incident beam and said pump beam with a single particle in said fluid flow.

20. The method of claim 16, wherein the particle has an effective diameter less than 100 nm.

* * * * *